Figure 1:
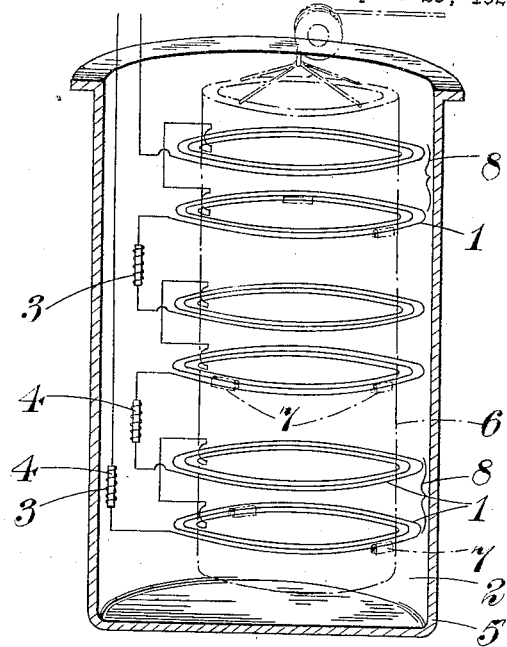

March 17, 1925.　　　　　　　　　　　　　　　　1,530,219
H. W. SULLIVAN
DUPLEX AND LIKE TELEGRAPHY
Filed April 25, 1922

INVENTOR.
Herbert Watson Sullivan
ATTORNEYS.

Patented Mar. 17, 1925.

1,530,219

UNITED STATES PATENT OFFICE.

HERBERT WATSON SULLIVAN, OF LONDON, ENGLAND.

DUPLEX AND LIKE TELEGRAPHY.

Application filed April 25, 1922. Serial No. 556,365.

*To all whom it may concern:*

Be it known that I, HERBERT WATSON SULLIVAN, a subject of the King of England, residing in London, England, have invented certain new and useful Improvements in Duplex and like Telegraphy, of which the following is a specification.

This invention relates to duplex and like telegraphy, that is to say, telegraphic systems in which an artificial line is employed electrically to balance in bridge formation, or differentially, the actual cable or line. In my Patent No. 1,468,982, issued Sept. 25, 1923, I have described the employment as part, at least, of the artificial line, of a length of cable core immersed in water arranged either in coil formation or as a single loop whereof the ends are brought out and so connected as to constitute the whole or part of the artificial line.

The present invention provides in an artificial line for telegraphy the combination of a plurality of coiled or other lengths of cable core immersed in water, and so disposed relatively to one another that the total self-inductance of the said lengths is less than the sum of the self-inductances of the said lengths taken separately, and either a self-inductance in series therewith to constitute an unitary electrical device or means to vary the said total self-inductance.

One construction provided by this invention is, in an artificial line, the combination of a plurality of pairs of coiled lengths of cable core immersed in water and so arranged that the mutual inductance between the members of a pair tends to neutralize the self-inductance of those members, and a self-inductance connected in circuit with the said members for the purpose of providing an evenly distributed self-inductance in the portion of the artificial line constituted by the said plurality of pairs.

This invention further provides an artificial line for telegraphy comprising a plurality of coiled lengths of cable core, so arranged that the mutual inductance between some at least of them tends to neutralize the self-inductance of the whole, immersed in water in an iron tank for the purpose described, with or without a central iron core embraced by the said coiled lengths, and with or without iron plates interposed, for the purpose described, between adjacent coiled turns of the said cable.

This invention also includes in an artificial line for telegraphy the combination with a pair of coiled lengths of cable core immersed in water and arranged so that mutual induction between them tends to reduce the self-inductance of the pair, of means to vary the position of the said lengths with relation to one another for the purpose of varying the mutual induction between them.

Alternative constructions embodying this invention are hereinafter described with reference to the accompanying drawings, in which—

Figure 1 illustrates diagrammatically one construction, and

Figure 2:
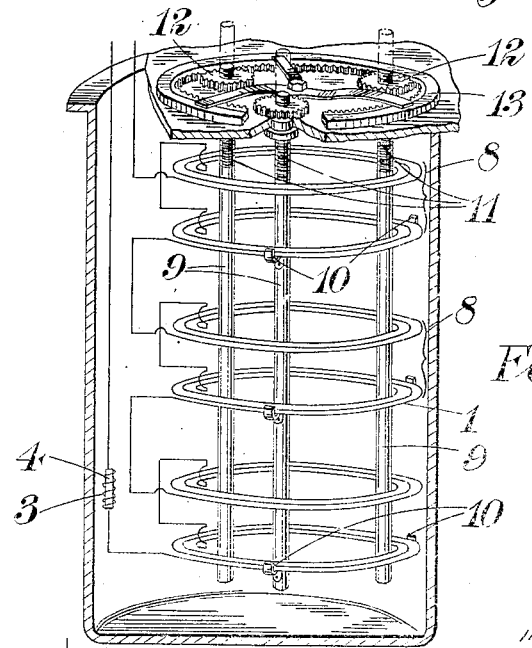

Figure 2 an alternative construction, whereas

Figure 3:
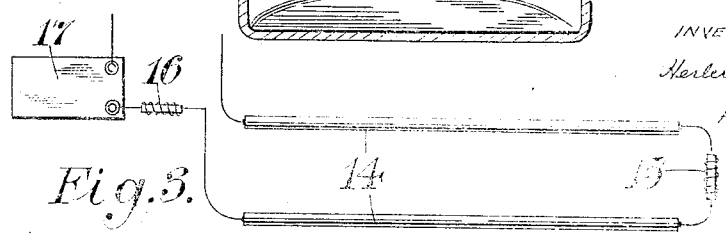

Figure 3 is a diagram of yet a further alternative method comprised within this invention.

The construction shown in Figure 1 comprises a number of pairs 8 of pancake coils 1 of cable core immersed in water 2 in a tank 5, the coils being superimposed one upon another, each member 1 of the pair upon its fellow, so that the whole number of coils have their winding axes coincident. The term "pair" is not to be understood in this specification as indicating necessarily two members that are identical with one another, but may describe two members that are approximately identical. It is to be understood that the cable core employed is such that the ratio of its electrical constants is the same or substantially the same as that of the signalling cable core. The members of each pair are separately balanced against one another to provide a small amount of total operative self-inductance but preferably so that the self-inductance of the upper member slightly preponderates over that of the lower.

In practice, and without intentional effort to secure such a result, it is found that one of the coils almost invariably differs slightly as to its self-inductance from the other, and it is found inconvenient to attempt to reduce the self-inductance of the larger, owing to the disturbance thereby produced in the other factors, namely, conductor resistance, capacity, absorption or leakage, etc. In the procedure provided by this invention, therefore, it is the smaller of the two self-inductances which is increased by adding self-inductance thereto as may be done in any known convenient manner.

Conveniently, a short length 3 of the core, at its point of junction between the two pairs, may be coiled round an iron core 4 supported to be adjustable in the coil and so provide an adjustable inductance. Each element or member of the pair may conveniently be about half a mile in length.

The container 5 for the coils, and for the water in which they are immersed, is conveniently an iron tank, and a central hollow iron core 6, indicated in chain line in Figure 1, may be provided adjustable to vary the degree of mutual inductance. The same effect may be obtained in any other convenient manner as, for example, by the insertion of one or more iron plates, shown in chain lines at 7, between adjacent convolutions of the coiled core.

In Figure 2 is illustrated diagrammatically a construction whereby a portion of the coiled core may be moved towards and away from the remainder so as to vary the mutual inductance between them. In this construction the lower members 1 of each of three pairs are supported upon vertical rods 9 by means of brackets 10 projecting from the rods. Each of the rods is screw-threaded at its upper end at 11 and engages a nut 12 in the form of a pinion. An internally toothed ring 13 is provided in engagement with each of the nuts so that by rotation of the ring these latter are simultaneously rotated and so serve to raise and lower the coils 1 supported upon the rods, with reference to the upper members of the pair. In this construction only one added self-inductance 3, 4 is shown, and it is to be understood that the number employed either in the arrangement of Figure 1 or Figure 2 may be any that is desired. Obviously, the number of pairs 8 of coils may be made such as is convenient.

In an alternative arrangement shown in Figure 3 in which the said portion of the artificial line comprises a single close bight 14 of cable core, for example one laid up with the signalling cable, an inductance or choking coil 15 is inserted electrically at the bend of the bight, thus dividing it into two elements each constituted by a substantially straight length of core, and a further inductance may be added, as indicated at 16, between the remainder 17 of the artificial line and that end of the bight which is connected thereto.

It is to be understood that the cable illustrated in Figure 3 may be used without the inductances 15 and 16 and may be laid as a loop of cable core extending into the sea.

Where, owing to difficulties arising from exceptionally corroding conditions, an iron tank is to be avoided, a tank of non-ferrous metal may be employed and an iron core inserted in the eye of the coils.

If preferred, the coils may be wound on bobbins instead of in pancake form, and further, as will be obvious, tappings may be taken from the junction points or any other convenient point after the manner followed with ordinary artificial line boxes.

What I claim as my invention and desire to secure by Letters Patent is:—

1. An artificial line for telegraphy and to balance electrically the signalling cable comprising in combination a length of cable core immersed in water the ratio of the electrical constants of which is substantially the same as that of the signalling cable and means for regulating the total self-inductance of said cable core, substantially as set forth.

2. An artificial line for telegraphy and to balance electrically the signalling cable comprising in combination a length of cable core immersed in water the ratio of the electrical constants of which is substantially the same as that of the signalling cable and a self-inductance in series therewith to form an unitary electrical device, substantially as set forth.

3. An artificial line for telegraphy and to balance electrically the signalling cable comprising in combination a length of cable core composed of a plurality of coils immersed in water the ratio of the electrical constants of which is substantially the same as that of the signalling cable, said coils being so disposed relatively to one another that the effective self-inductance of said coils taken together is less than the sum of self-inductances of said coils taken separately and means for increasing the said total self-inductance, substantially as set forth.

4. An artificial line for telegraphy and to balance electrically the signalling cable comprising in combination a length of cable core composed of a plurality of pairs of coils immersed in water the ratio of the electrical constants of which is substantially the same as that of the signalling cable, the members of said pairs being so arranged that the mutual inductance between them tends to neutralize the self-inductance of the whole and means associated with said coils for increasing the total self-inductance of the cable core, substantially as set forth.

5. An artificial line for telegraphy comprising in combination a length of cable core composed of a plurality of pairs of coils immersed in water, the members of said pairs being arranged co-axially and in such a manner that some at least tend to neutralize the self-inductance of said members and means for increasing the total self-inductance of said cable core, substantially as set forth.

6. An artificial line for telegraphy comprising in combination a length of cable core composed of a plurality of pairs of coils immersed in water, the members comprising said pairs being arranged co-axially and having their coils oppositely wound so as to tend to neutralize the self-inductance of said members and means for increasing the total self-inductance of said cable core, substantially as set forth.

7. An artificial line for telegraphy comprising in combination a plurality of pairs of co-axially coiled lengths of cable core immersed in water, means for adjusting the position of one member of each pair relatively to the other and an inductance in circuit with said coils to regulate the total self-inductance of said cable core, substantially as set forth.

8. An artificial line for telegraphy comprising in combination a plurality of pairs of co-axially disposed lengths of coiled cable core immersed in water, rods parallel to the axis of said coils and supporting one member of each pair of coils, means associated with said rods for moving the supported members along the axis of said coils and an inductance in circuit with said coils to regulate the total self-inductance of said cable core, substantially as set forth.

9. An artificial line for telegraphy comprising in combination a plurality of pairs of co-axially coiled lengths of cable core immersed in water, rods parallel to the axis of said coils and supporting one member of each pair of coils, said rods being screw-threaded at their upper ends and engaging means for raising and lowering the supported members of said coils and a self-inductance in circuit with said coils to regulate the total self-inductance of said cable core, substantially as set forth.

10. An artificial line for telegraphy comprising in combination a plurality of co-axially disposed coiled lengths of cable core immersed in water and connected in circuit with a self-inductance, rods screw-threaded at one end and capable of supporting every other member of said coils, pinion shaped nuts threaded on said rods, said nuts engaging with an internally toothed ring and means for operating said ring to vary the position of said coils, substantially as set forth.

11. An artificial line for telegraphy comprising in combination a plurality of co-axially wound coils of cable core immersed in water and connected in circuit with a self-inductance and ferro-magnetic means associated with said coils for regulating the total self-inductance of said cable core, substantially as set forth.

12. An artificial line for telegraphy comprising in combination a plurality of co-axially disposed pancake coils of cable core superimposed one on the other in a tank containing water and connected in circuit with a self-inductance, rods screw-threaded at their upper ends in said tank capable of supporting every other member of said coils, pinion shaped nuts threaded on the upper ends of said rods, said nuts engaging with an internally toothed ring mounted at the top of said tank and means for revolving said ring so as to vary the position of the supported members of said coils, substantially as set forth.

13. An artificial line for telegraphy comprising in combination a plurality of co-axially wound coils of cable core immersed in water and connected in circuit with a self-inductance and ferro-mangetic means capable of being adjusted relatively to said coils for regulating the total self-inductance of said cable core, substantially as set forth.

14. In an artificial line for telegraphy the combination of a plurality of coiled or other lengths of cable core immersed in water and so disposed relatively to one another that the effective self-inductance of the said lengths taken together is less than the sum of the self-inductances of the said lengths taken separately and either a self-inductance in series therewith to constitute with them an unitary electrical device or means to vary the said total self-inductance, substantially as set forth.

15. In an artificial line for telegraphy the combination with a plurality of pairs of coiled lengths of cable core immersed in water and so arranged that the mutual inductance between the members of a pair tends to neutralize the self-inductance of those members of a self-inductance connected in circuit with the said pairs for the purpose of providing a distributed self-inductance in the portion of the artificial line constituted by the said plurality of pairs, substantially as set forth.

16. An artificial line for telegraphy comprising a plurality of coiled lengths of cable core so arranged that the mutual inductance between some at least of them tends to neutralize the self-inductance of the whole and immersed in water in an iron tank for the purpose described with a central iron core embraced by the said coiled lengths and with iron plates interposed for the purpose described between adjacent turns of the said coiled cable, substantially as set forth.

17. In an artificial line for telegraphy the combination with a pair of coiled lengths of cable core immersed in water and arranged so that mutual induction between them tends to reduce the self-inductance of the pair, of means to vary the position of the said lengths with relation to one another for the purpose of varying the mutual induction between them, substantially as set forth.

In testimony whereof I affix my signature.

HERBERT WATSON SULLIVAN.